US010833945B2

(12) United States Patent
Leekin et al.

(10) Patent No.: US 10,833,945 B2
(45) Date of Patent: Nov. 10, 2020

(54) MANAGING DOWNLOADING OF CONTENT

(71) Applicant: International Business Machines Corporation, Armonk, NY (US)

(72) Inventors: Rachel Leekin, White Plains, NY (US); Pramod Verma, Fairfax, VA (US); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/188,393

(22) Filed: Nov. 13, 2018

(65) Prior Publication Data

US 2020/0153696 A1    May 14, 2020

(51) Int. Cl.
| | | |
|---|---|---|
| *G06F 15/16* | (2006.01) | |
| *H04L 12/24* | (2006.01) | |
| *H04L 29/06* | (2006.01) | |
| *G06F 3/01* | (2006.01) | |

(52) U.S. Cl.
CPC .......... *H04L 41/0896* (2013.01); *G06F 3/012* (2013.01); *G06F 3/013* (2013.01); *H04L 65/4023* (2013.01)

(58) Field of Classification Search
CPC . H04L 41/0896; H04L 65/4023; G06F 3/012; G06F 3/013
USPC ........................................................ 709/219
See application file for complete search history.

(56) References Cited

U.S. PATENT DOCUMENTS

| | | | | |
|---|---|---|---|---|
| 6,106,119 A | | 8/2000 | Edwards | |
| 6,437,758 B1* | | 8/2002 | Nielsen | G06F 3/013 345/7 |
| 8,643,680 B2* | | 2/2014 | Baldwin | G06F 3/013 345/684 |
| 8,767,014 B2* | | 7/2014 | Vaught | G02B 27/017 345/633 |
| 8,964,298 B2* | | 2/2015 | Haddick | G06F 3/013 359/630 |
| 8,970,495 B1* | | 3/2015 | Biffle | G09G 3/003 345/158 |
| 9,377,863 B2* | | 6/2016 | Bychkov | G06F 3/017 |
| 9,442,292 B1* | | 9/2016 | Gao | G02B 27/0172 |
| 9,600,069 B2* | | 3/2017 | Publicover | G06F 21/32 |
| 9,626,084 B2* | | 4/2017 | Waggoner | G06F 3/04842 |
| 9,681,122 B2* | | 6/2017 | Wilson | G06F 3/011 |
| 9,727,136 B2* | | 8/2017 | Wilairat | G02B 27/0172 |

(Continued)

OTHER PUBLICATIONS

Patil et al., GazeTube: Gaze-Based Adaptive Video Playback for Bandwidth and Power Optimizations, Dec. 6-10, 2015, IEEE (Year: 2015).*

*Primary Examiner* — Melvin H Pollack
(74) *Attorney, Agent, or Firm* — Schmeiser, Olsen & Watts, LLP; Michael A. Petrocelli

(57) ABSTRACT

A method of managing downloading of content includes receiving, by one or more processors of a computer system, a request to download content by a user, analyzing, by the one or more processors of the computer system, the gaze of the user relative to an intended location of the content on a display, determining, by the one or more processors of the computer system, an interest in the content based on the analyzing of the gaze of the user, and adjusting, by the one or more processors of the computer system, a rate of download of the content by the user based on the determining.

20 Claims, 8 Drawing Sheets

(56) References Cited

U.S. PATENT DOCUMENTS

| | | | |
|---|---|---|---|
| 9,737,209 B2* | 8/2017 | Gramatikov | G06K 9/00604 |
| 9,756,349 B2* | 9/2017 | Perlman | A63F 13/12 |
| 9,870,060 B2* | 1/2018 | Marggraff | G06F 3/04842 |
| 9,965,681 B2* | 5/2018 | Border | G06K 9/00604 |
| 9,997,199 B2* | 6/2018 | Gewickey | G11B 27/036 |
| 10,032,277 B2* | 7/2018 | Ratcliff | G06F 3/013 |
| 10,061,349 B2* | 8/2018 | Pomerantz | H04N 5/23229 |
| 10,112,111 B2* | 10/2018 | Marks | A63F 13/525 |
| 10,142,020 B2* | 11/2018 | Aoyama | H04L 7/0075 |
| 10,154,254 B2* | 12/2018 | Trail | G06F 3/0304 |
| 10,242,379 B2* | 3/2019 | Ha | G06Q 30/0242 |
| 10,264,211 B2* | 4/2019 | Leech | H04N 19/115 |
| 10,319,072 B2* | 6/2019 | Grange | G06T 3/20 |
| 10,403,048 B2* | 9/2019 | Sou | G06K 9/00033 |
| 10,419,655 B2* | 9/2019 | Sivan | H04W 4/80 |
| 10,440,416 B1* | 10/2019 | Phillips | H04N 19/172 |
| 10,466,779 B1* | 11/2019 | Liu | G02B 27/017 |
| 10,481,682 B2* | 11/2019 | Marggraff | G06F 3/0354 |
| 10,489,043 B2* | 11/2019 | Feris | G06F 3/011 |
| 10,528,130 B2* | 1/2020 | Maltz | G06F 3/013 |
| 10,539,787 B2* | 1/2020 | Haddick | G02B 27/017 |
| 10,540,005 B2* | 1/2020 | Yoon | G06F 3/0482 |
| 10,591,728 B2* | 3/2020 | Shams | G02B 27/0093 |
| 10,591,731 B2* | 3/2020 | Davami | H04N 5/23258 |
| 10,598,929 B2* | 3/2020 | Teller | G02B 27/14 |
| 10,614,616 B1* | 4/2020 | Tedesco | G06F 3/04815 |
| 10,623,736 B2* | 4/2020 | Phillips | H04N 21/816 |
| 2003/0052911 A1 | 3/2003 | Cohen-solal | |
| 2005/0047629 A1 | 3/2005 | Farrell et al. | |
| 2010/0004977 A1* | 1/2010 | Marci | G06Q 30/0203 705/7.32 |
| 2011/0175914 A1* | 7/2011 | Levanon | G06F 3/1454 345/428 |
| 2012/0144288 A1* | 6/2012 | Caruso | G06F 16/9577 715/234 |
| 2015/0097772 A1* | 4/2015 | Starner | G06F 3/013 345/158 |
| 2015/0373129 A1* | 12/2015 | Serbinis | H04L 67/1021 709/219 |
| 2016/0109945 A1* | 4/2016 | Kempinski | G06F 3/013 348/78 |
| 2018/0007422 A1* | 1/2018 | Castleman | G11B 20/10527 |
| 2018/0253159 A1* | 9/2018 | Ramaiah | G06F 3/0346 |
| 2018/0275751 A1* | 9/2018 | Wilson | G06F 16/51 |
| 2019/0050664 A1* | 2/2019 | Yang | G02B 27/0172 |
| 2019/0158863 A1* | 5/2019 | Mory | H04L 65/80 |
| 2019/0173929 A1* | 6/2019 | Guardini | H04L 65/601 |
| 2019/0212827 A1* | 7/2019 | Kin | G06F 3/011 |
| 2019/0286230 A1* | 9/2019 | Sullivan | G06T 3/60 |
| 2019/0317594 A1* | 10/2019 | Stent | G05D 1/0221 |
| 2020/0045346 A1* | 2/2020 | Houze | G09B 9/307 |
| 2020/0107003 A1* | 4/2020 | Phillips | H04N 19/162 |

* cited by examiner

MANAGING DOWNLOADING OF CONTENT

TECHNICAL FIELD

The present invention relates to systems and methods for managing bandwidth demands. More specifically, the invention relates to systems and methods for managing downloading of content by users.

BACKGROUND

Today users are constantly downloading content, such as images, video or the like, while browsing websites, using web-based applications, or the like. During times of limited connectivity or bandwidth, web content may take longer to download by a user device. In some instances, images may be rendered gradually, such that a partial image is visible after the download has begun but before the download has completed. As more of the image or video is downloaded, the image or video may continue to update. It is further often the case that web content or web-based applications may require the simultaneous download of many images to fully render a web page or web-based application interface. In these situations, it may take even longer, and require more bandwidth, to fully download the content that a user is attempting to access through web browsing or through user interaction with web-based applications. As such, systems and methods for improving the management of bandwidth demands by users would be well received in the art.

SUMMARY

An embodiment of the present invention relates to a method, and associated computer system and computer program product, of managing downloading of content by users. One or more processors of a computer system receive a request to download content by a user. The one or more processors of the computer system analyze the gaze of the user relative to an intended location of the content on a display. The one or more processors of the computer system determine an interest in the content based on the analyzing of the gaze of the user. The one or more processors of the computer system adjust a rate of download of the content by the user based on the determining.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention improves and optimizes computer systems and computer networks by requiring less data to be transmitted over a data network while still achieving equal satisfaction by a data consumer. The present invention improves and optimizes computer systems by managing downloading of content and controlling bandwidth according to a novel configuration of sensors, information analysis, and/or bandwidth control systems. The present invention is thus capable of reducing the bandwidth demand on a network by requiring less data to be communicated over the network. The prioritization of data transfer described herein further improves network systems and computers by allowing data to be transmitted as it is needed for consumption. Still further, the present invention provides for improved performance of user computers or devices by allowing user computers or devices to achieve greater download speeds related to information, images, videos or other content or media that the user is most interested in. The present invention still further improves the performance of network or internet service provider computing systems and networks which distribute bandwidth and information to user devices by allowing such distribution of bandwidth and information to be catered more directly to user demand. The present invention thus provides an improved system for allowing network or internet service providers to reduce the amount of information provided to customers while maintaining and/or improving user experience.

Figure 1:
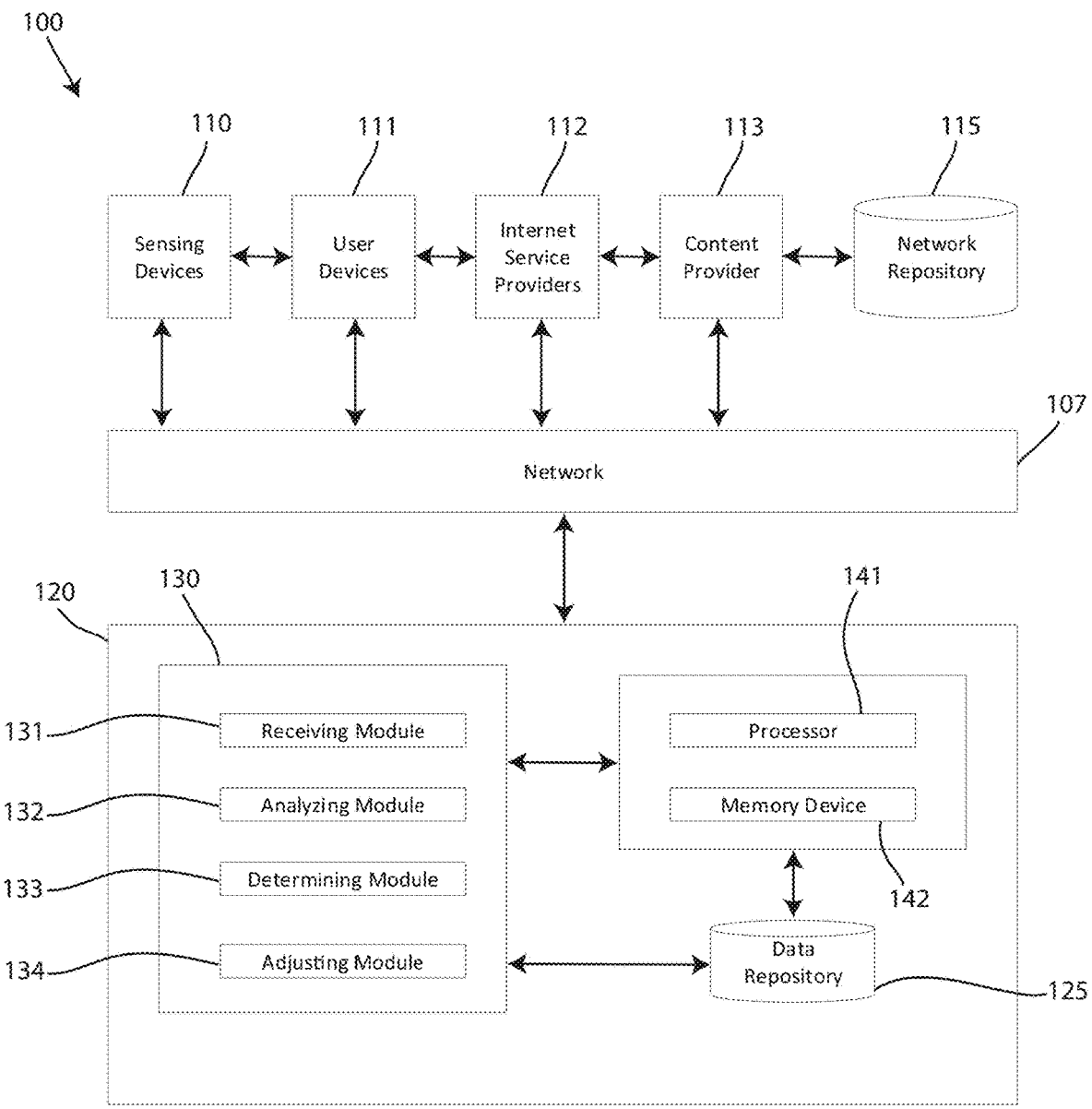
FIG. 1 depicts a block diagram of a system for managing downloading of content, in accordance with embodiments of the present invention.

Referring to the drawings, FIG. 1 depicts a block diagram of a system for managing downloading of content 100, in accordance with embodiments of the present invention. The system for managing downloading of content 100 may include one or more sensing devices 110, one or more user devices 111, one or more network service providers 112, one or more content providers 113, and one or more network repositories 115 connected over a network 107 to a computer system 120. While FIG. 1 shows the sensing devices 110, user devices 111, network service providers 112, content providers 113 and network repositories 115 directly connected to adjacent elements 110, 111, 112, 113, 115, any interconnection of elements 110, 111, 112, 113, 115 is contemplated. Some or all of the sensing devices 110, user devices 111, network service providers 112, content providers 113 and network repositories 115 may be interconnected to each other in any manner. Further, while each of the elements 110, 111, 112, 113, 115 are shown as separate features of the system for targeted content identification 100, in some embodiments one or more of the elements 110, 111, 112, 113, 115 may be combined with or overlap with each other without departing from the scope of the invention.

The user devices 111 may be any device that a user operates that is capable of downloading content. For example, user devices 111 may be a personal computer, a desktop computer, a laptop computer, a mobile communicator such as a mobile phone, a tablet, a personal digital assistant device, a wearable device such as a watch, a media storage device, a display device, or any other device connectable to the network 107 and the computer system 120 that is owned and/or operated by a user. The user devices 111 may be connected to the internet through an internet service provider such as one of the internet service providers 112. The user devices 111 may also include one or more display screens capable of displaying downloaded content.

The sensing devices 110 may be any device configured to determine a direction of a gaze of a user. The sensing devices 110 may further be configured to sense the attentiveness of a user toward a particular thing, location, or the like. The sensing devices 110 may be configured to, for example, determine the location or orientation of a user's eyes, face, head, neck, body and/or the like. The sensing devices 110 may each be integrated, attached, or otherwise connected to one of the user devices 111. The sensing devices 110 may be a camera, a webcam, an image capture device, a movement detector sensor, or any device that may be capable of determining, or facilitating the determination of, the gaze of a user. The sensing devices 110 may any device that may be capable of determining, or facilitating the determination of, the attentiveness of a user toward a particular piece of content being rendered or displayed on a screen.

The sensing device 110 may be disposed in a fixed location relative to a display of a user device 111 being operated by a user during performance of the methods described herein. By being fixed to a display of a user device, the sensing devices 110 may facilitate the computer system 120 in correlating gaze-related information sensed by the sensing devices 110 to information related to images or content being displayed on a screen of the user devices 111. In other embodiments, the sensing devices 110, the user devices 111 and/or the computer system 120 may include a configuration tool, application or program that may be capable of determining the location of the sensing device 110 relative to a display of a respective user device 111 to which the sensing device 110 is attached and/or configure the sensing device 110.

The one or more network service providers 112 may be any system for providing service for accessing the internet, such as an internet service provider (ISP). The network service providers 112 may be commercial, community-owned, not for profit, or otherwise privately owned. The network service providers 112 may provide internet access, internet transit, domain name registration, web hosting, or the like. The network service providers 112 may be cellular network service providers. The network service providers 112 may be local network service providers. The network service providers 112 may be an upstream internet service provider that contracts with one or more downstream internet service providers. The network services providers 112 may provide cable internet services, DSL internet services, fiber internet services, wireless internet services, satellite internet services or the like. The network service providers 112 may be any network capable of providing or otherwise delivering content to user devices over a network. The one or more network services providers 112 may be configured to control the use of bandwidth over a network utilized by a user via a user device.

The content providers 113 may be any entity that hosts content accessible over the internet or web-connected application. The content providers 113 may be configured to host content created by content creators so that users may access such content via the network service providers 112 over the internet. The content providers 113 may be the content creators, or may be contracted by the content creators to host delivery services of the content created by content creators. The content providers 113 may be capable of handling the distribution of online content such as blogs, videos, music, images, files, websites, or the like.

The network repository 115 may be a data collection area on the network 107 which may back up and save all the data transmitted back and forth between the nodes of the network 107. For example, the network repository 115 may be a data center saving and cataloging user data sent or received by the user devices 111, sent across the network service providers 112 or the like. The network repository 115 may use this data to generate databases related to the information received. In some embodiments, a data collection center housing the network repository 115 may include an analytic module capable of analyzing each piece of data being stored by the network repository 115. Further, the computer system 120 may be integrated with or may be a component of the data collection center housing the network repository 115. In some alternative embodiments, the network repository 115 may be a local repository that is connected to the computer system 120.

The network 107 may be any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to the sensing devices 110, user devices 111, network service providers 112, content providers 113 and network repositories 115 via the network 107.

Embodiments of the computer system 120 may include a module structure 130 that includes a receiving module 131, an analyzing module 132, a determining module 133, and an adjusting module 134. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 may include one or more components of hardware and/or software program code for obtaining, retrieving, collecting, or otherwise receiving information from the one or more user devices 111, the one or more sensing devices 110, the one or more network service providers 112, and/or the one or more content providers 113. In an exemplary embodiment, the receiving module 131 may be configured to receive information from the sensing devices 110 related to the gaze, facial direction, or attentiveness of the user. The receiving module 131 may further be configured to receive information from the user devices 111, the internet service providers 112 and/or the content providers 113 related to, for example, content requested by the user for download over a network. The receiving module 131 may receive information related to the requested content, including the type of the content, and the location of the content on a display, user interface, browser, or the like. example, the receiving module 131 may be configured to receive information related to a request for download from the user device 131. The receiving module 131 may further be configured to receive information related to the particular user device 131 which may be helpful in understanding how the user device will display requested information. This received information may include the state of the display of the user device, such as where the user's browser or displaying window is located on the display of the user device. The receiving module 131 may further be configured to receive information related to the content requested from the content provider 113, such as the file types, sizes, resolutions, and orientations from the content provider 113. The receiving module 131 may be configured to receive information from the sensing devices 110 related to the attentiveness of the user toward a particular location on the display screen corresponding to content being requested. The receiving module 131 may be configured to receive information related to bandwidth or maximum download speed from the network service providers 112.

The receiving module 131 may provide information received by the computer system 120 from the user devices 111, the sensing devices 110 the network service providers 112, and the content providers 113 to be stored in the data repository 125, or the receiving module 131 may provide information received directly to the analytics module 132 for analysis.

Embodiments of the analyzing module 132 may include one or more components of hardware and/or software program code for analyzing information received by the receiving module 131 or stored in the data repository 125. The analyzing module 132 may be configured to analyze the gaze of a user using a user device 111 relative to an intended location of the content requested by the user on a display of the user device 111. The analyzing module 132 may thus be configured to analyze image information received by the receiving module 131 from the sensing devices 110, and analyze this information to determine a gaze location of a user, or in what direction a user is looking relative to a display or user device.

The analyzing module 132 may further be configured to analyze information received by the receiving module 131 from the content provider 113 and the user device 111 related to the location of the content that is being loaded onto a display of the user device. For example, the analyzing module 132 may be configured to find one or more locations on a screen or display of a user device 111 that correspond to the one or more locations that an image is being loaded based on a request by a user to download such images. The analyzing module 132 may thus be configured to analyze both the sensed information from the sensing devices 110 and the browser or application related information related to where on a display of a user device an image is being rendered.

Embodiments of the determining module 133 may include one or more components of hardware and/or software program code for determining an interest in content based on the analyzing of the gaze relative to an analyzed image location on a display of a user device. The determining module 133 may thus be configured to determine that a user is looking at a particular image, video, or other content that is being rendered on the display of the user device. The determining module 133 may likewise be configured to determine that a user is not looking at a particular image, video or other content that is being rendered on the display of the user device. The determining module 133 may be configured to determine a particular location on a screen that a particular image, video, or other content, is being rendered. Similarly, the determining module 133 may be configured to determine whether a person is attentive to a given piece of rendered content. The determining module 133 may consider time when determining if a person is gazing or attentive toward a particular rendered content. For example, the determining module 133 may determine that a user is particularly interested in a given piece of content being rendered if the person has been staring or gazing at the content for at least 1 second, or at least 2 seconds, for example. Likewise, the determining module 133 may determine that a user is not interested in a given piece of content being rendered if the person has not been staring or gazing at the content for the past 1 second, 2 seconds, or the like.

Embodiments of the adjusting module 134 may include one or more components of hardware and/or software program code for adjusting a rate of download of content by the user based on the determined gaze and/or attentiveness of the user toward that content. For example, the adjusting module 134 may be configured to prioritize the download of content, an image, a video, or the like, above other content, images, videos or the like based on the determined gaze and/or attentiveness of the user being in the direction of that content, image, video, or the like. Similarly, the adjusting module 134 may be configured to de-prioritize the download of content, an image, a video, or the like, above other content, images, videos or the like based on the determined gaze and/or attentiveness of the user being not the direction of that content, image, video, or the like. The adjusting module 134 may be configured to upgrade or reduce a rate of providing content, an image, a video, or the like, based on the determined gaze and/or attentiveness of the user toward that content, image, video, or the like. The adjusting module 134 may be configured to pause or resume downloading content, an image, a video or the like, based on the determined gaze and/or attentiveness of the user toward that content, image, video or the like. Still further, the adjusting module 134 may be configured to enable or disable downloading content, an image, a video or the like, based on the determined gaze and/or attentiveness of the user toward that content, image, video or the like. The adjusting module 134 may be configured to adjust the rate of download down to zero in order to prevent or stop the download of content completely. For example, the adjusting module 134 may be configured to stop or prevent all download of content that is not being looked at by the user. The stopping or prevention may be permanent or temporary. The adjusting module 134 may be programmed to provide any type of download adjustment based on the particular interest detected and determined by the determining module 133.

While the above described system for managing downloading of content 100 has been described as managing download rates of images, it should be understood that impacting download rates may further impact upload rates of transfer from, for example, the content providers 113 to the user devices 111. Thus, the present methods described herein and computer system 120 may be applicable to adjust both the download speed and upload speed of content. Further, the present methods and computer system 120 described herein may be capable of adjusting speeds at the network service provider level, the user device level, or the content provider level. The methods and computer system 120 described herein may therefore be capable of improving performance of each of these types of devices and systems (user devices, content provider systems, and network service provider systems).

Referring still to FIG. 1, embodiments of the computer system 120 may be equipped with a memory device 142 which may store the information related to the data center 110 and/or the battery system 111 thereof. The computer system 120 may further be equipped with a processor 141 for implementing the tasks associated with the system for managing downloading of content 100. While the computer system 120 is shown as a separate system relative to each of the user devices 111, network service providers 112, or content providers 113, in some embodiments the functionality and module structure 130 of the computer system 120 may be integrated into the user devices 111. Additionally or alternatively, the computer system 120 or module structure 130 thereof may be integrated into one or both of the network service providers 112 and/or the content providers 113.

Figure 2:
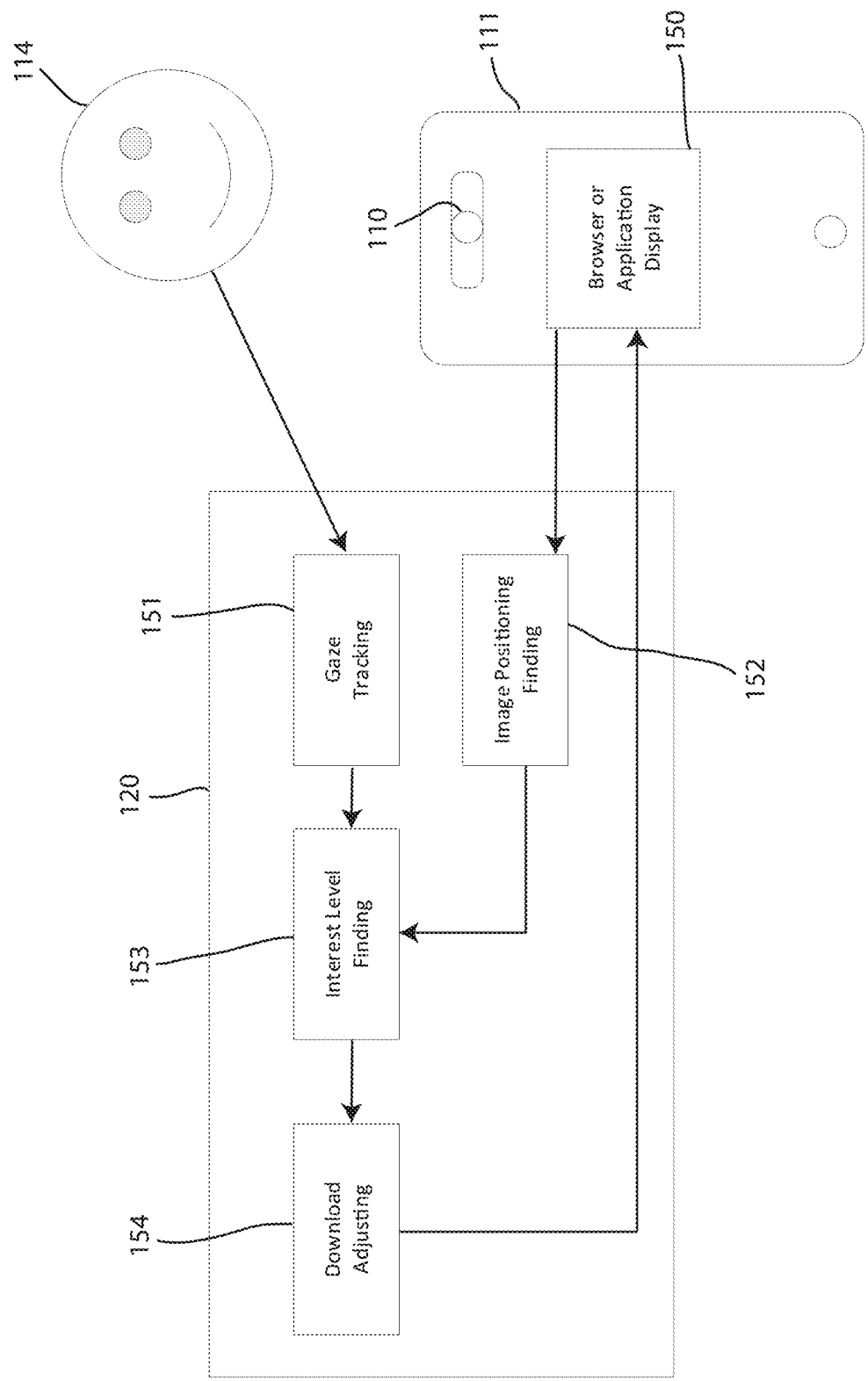
FIG. 2 depicts a system architecture in accordance with embodiments of the present invention.

FIG. 2 depicts a system architecture in accordance with embodiments of the present invention. The system architecture includes the computer system 120 interacting with a user 114 that is using a user device 111. The user device 111 includes a display 150 that may be showing an application or browser. The user device 111 further includes a sensing device 110, which may be an image capture device or camera. The system architecture includes the user device 111 communicating directly with the computer system 120 for image position finding 152. The image position finding 152 may include determining a position of the image on the display 150 of the user device 111. The system architecture includes the user 114, while looking at the device 111, providing attentiveness related information, such as gaze information, or the direction of the user's eyes or view, for gaze tracking 151 by the computer 120. Once both gaze tracking 151 and image position finding 152 is complete, for example, by the analyzing module 132 of the computer system 120, the computer system 120 may provide for interest level finding 153. Interest level finding 153 may include determining whether a person is interested in a particular piece of content, an image, a video, or the like, that is currently being downloaded or rendered on the display 150 of the user device 111. The interest level finding 153 may be accomplished, for example, by the determining module 133. After interest level finding 153 is complete, the system architecture includes download adjusting 154. The download adjusting 154 may be performed by the adjusting module 134. The download adjusting 154 may provide the updated download adjustment back to the user device 111, the content provider 113, or the network service provider 112 in a manner that directly impacts the rendering or downloading of the content on the display 150 of the device 111.

Figure 3:
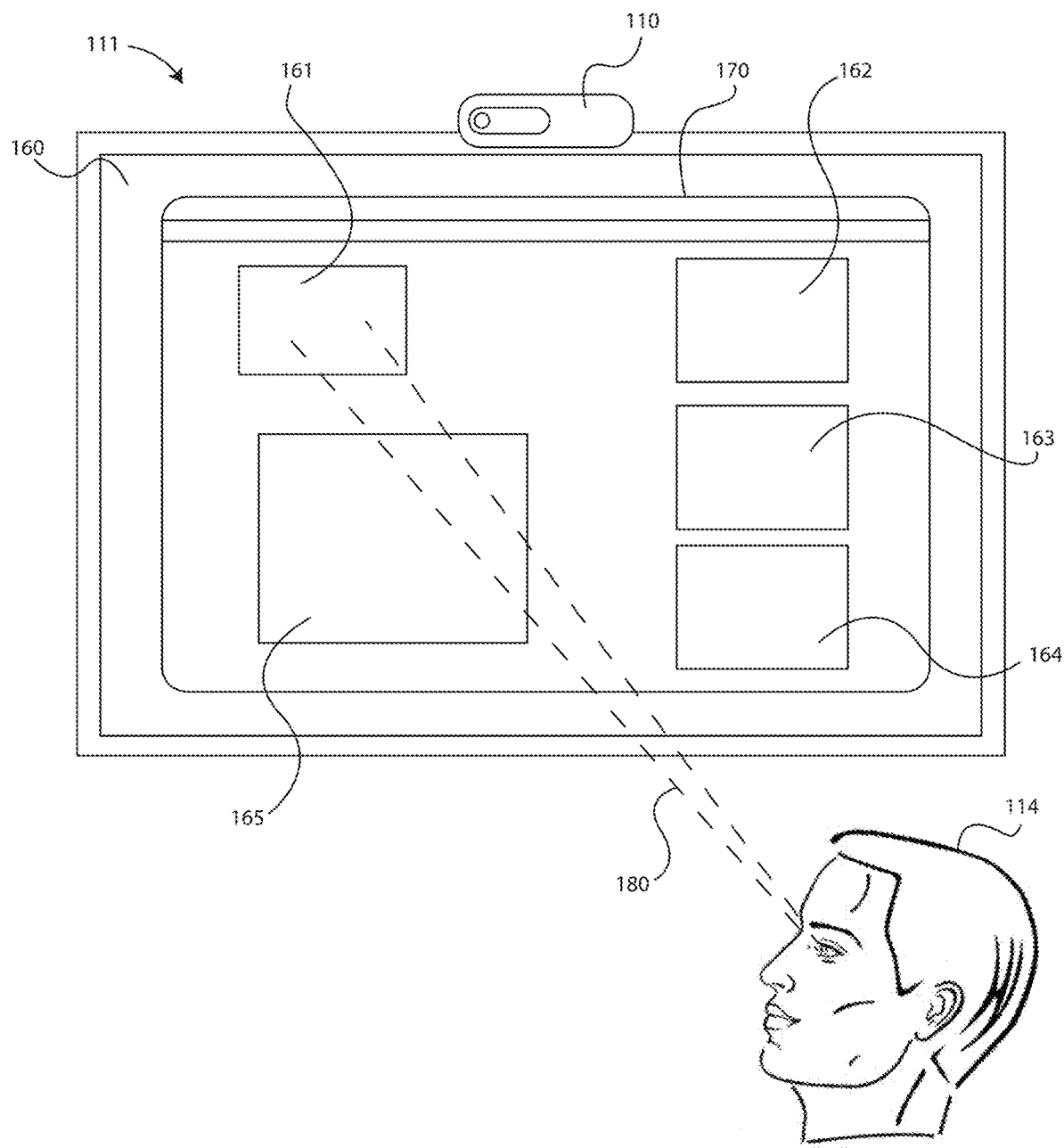
FIG. 3 depicts a user device of the system of FIG. 1 having a display being viewed by a user, in accordance with embodiments of the present invention.

FIG. 3 depicts a user device 111 of the system 100 of FIG. 1 having a display 160 being viewed by a user 114, in accordance with embodiments of the present invention. A sensing device 110 is shown attached above the display 160 of the user device 111. The sensing device 110 shown is a webcam device. Rendered on the display 160 of the user device 111 is shown a window 170, such as a browser window. Within the window 170 is shown several separate images currently being rendered at the request of the user 114. For example, the user 114 may have directed the browser window 170 to open or download a new webpage. In so doing, the browser window 170 is shown rendering or downloading a first image 161, a second image 162, a third image 163, a fourth image 164, and a fifth image 165. While the embodiment has been described with the content as images, it should be understood that one or more of the images 161, 162, 163, 164, 165 may be video, text, or other downloadable content. As shown, the user 114 includes a gaze 180. "Gaze" herein refers to a direction the user is looking in, or a location that the user is looking at. As shown, the gaze 180 of the user 114 is directed to the first image 161. In this embodiment, the sensing device 110 (webcam) may capture an image that includes the direction of the gaze 180 of the user 114. The user device 111 may be connected to the sensing device 110 and may provide this image related information to the computer system 120 and the module structure 130 thereof. The user device 111 may further provide information to the computer system 120 related to the location on the display 160 that each of the images 161, 162, 163, 164, 165 are being rendered. The computer system 120 and the module structure 130 thereof may utilize this provided information to determine that the gaze 180 of the user 114 is directed to the first image 161. The computer system 120 may direct the user device 111, the network service provider 112 and/or the content provider 113 to allow the user device 111 to download the first image 161 faster. The computer system 120 may further direct the user device 111, the network service provider 112 and/or the content provider 113 to prevent download of the other images 162, 163, 164, 165 that the user 114 is not interested, or lower their download priority.

Figure 4:
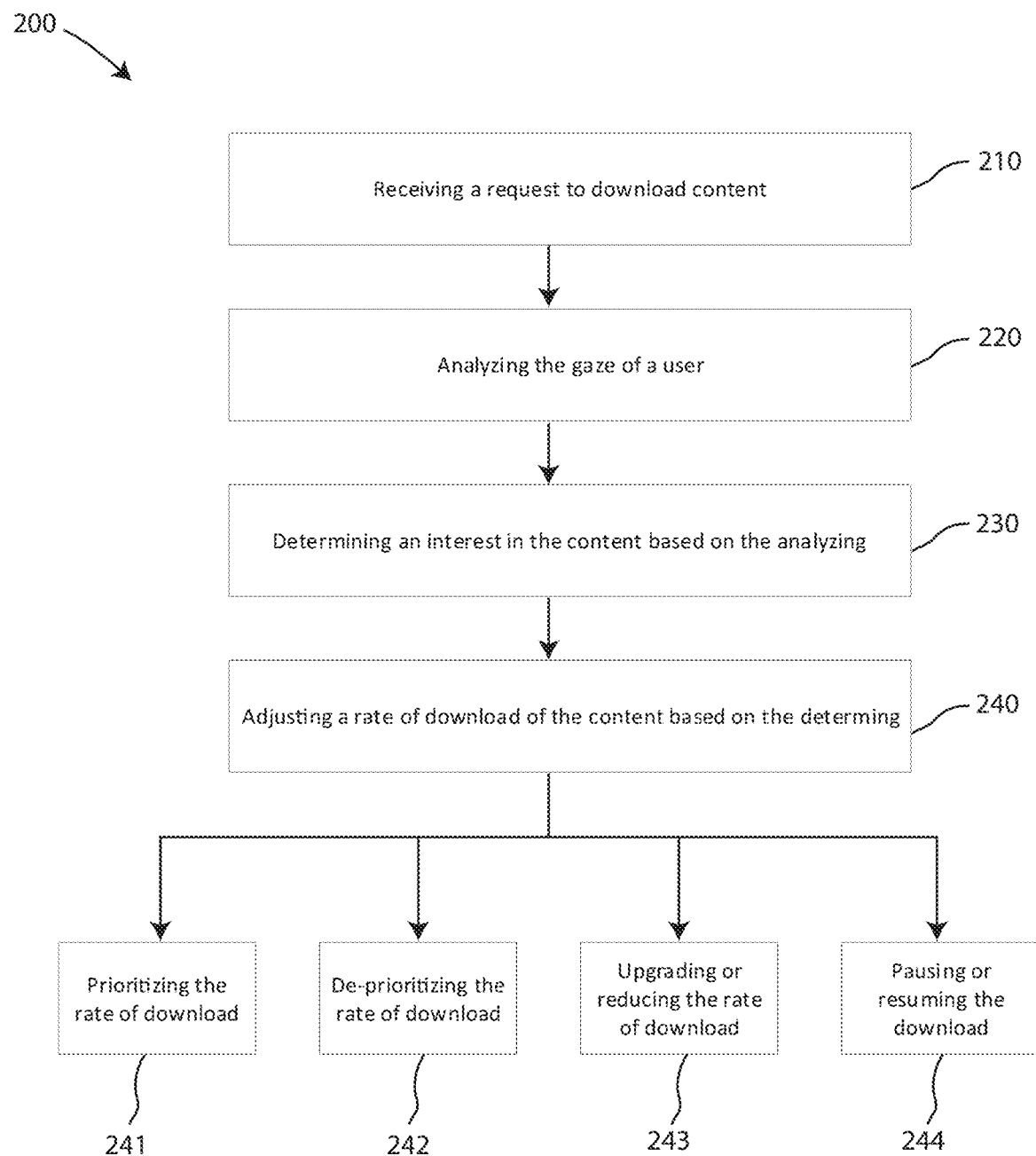
FIG. 4 depicts a flow chart of a method for managing downloading of content, in accordance with embodiments of the present invention.

FIG. 4 depicts a flow chart of a method 200 for managing downloading of content, in accordance with embodiments of the present invention. The method 200 includes a step 210 of receiving, by one or more processors of a computer system, such as the receiving module 131 of the computer system 120, a request to download content, such as the content 161, by a user, such as the user 114. The method 200 may include a step 220 of analyzing, by the one or more processors of the computer system, such as the analyzing module 132 of the computer system 120, the gaze, such as the gaze 180 of the user relative to an intended location of the content on a display, such as the display 160. The method 200 may include a step 230 of determining, by the one or more processors of the computer system, such as the determining module 133 of the computer system 120, an interest in the content based on the analyzing of the gaze of the user. The method 200 may include a step 240 of adjusting, by the one or more processors of the computer system, a rate of download of the content by the user based on the determining.

The adjusting step 240 may include, for example, a step 241 of prioritizing, by the one or more processors of the computer system, the download, or the rate of download, of a first image or other content portion of the content above the other images or content portion of the content based on the determined interest in the first image. The adjusting step 240 may further include, for example, a step 242 of de-prioritizing, by the one or more processors of the computer system, the download, or the rate of download, of a first image or content portion of the content above the other images or content portion of the content based on the determined interest in the first image. The adjusting step 240 may include, for example, a step 243 of upgrading or reducing, by the one or more processors of the computer system, the rate of providing the content to the user based on the determined interest in the content. The adjusting step 240 may include, for example, a step 244 of pausing or resuming, by the one or more processors of the computer system, the download of the content based on the determined interest in the content.

The method 200 may further include gradually rendering gradually rendering, by the one or more processors of the computer system, the content, wherein the analyzing occurs during the gradual rendering. Thus, the content may be provided to the display of the user device over time, and may not immediately download, whereby a user can view a portion of the content, or a low resolution rendition of the content. The download of the higher resolution data pertaining to the partially provided content may be adjusted based on the analyzing and determining by the analyzing and determining modules 132, 133.

Figure 5:
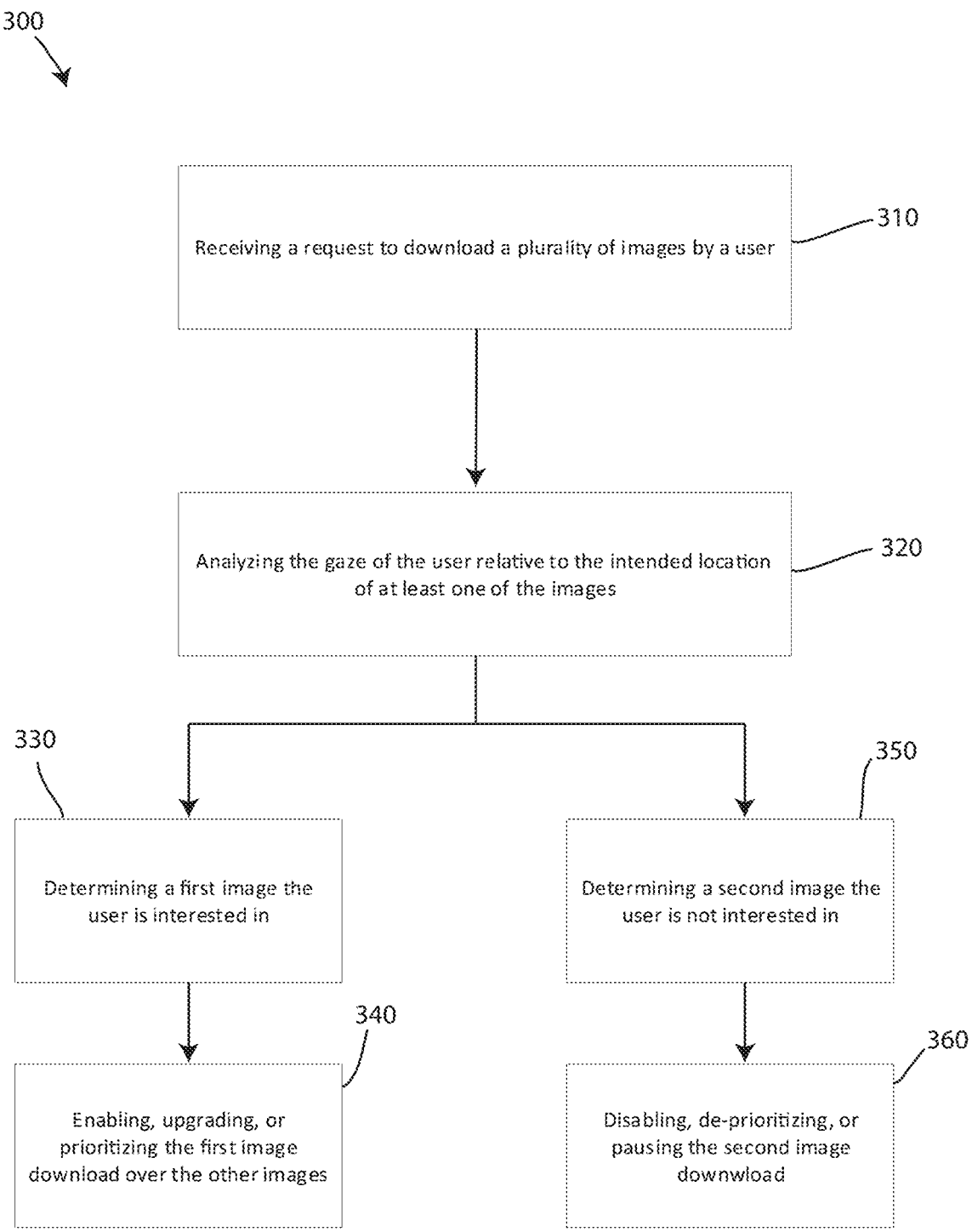
FIG. 5 depicts a flow chart of a method for managing downloading of content, in accordance with embodiments of the present invention.

FIG. 5 depicts a flow chart of a method 300 for managing downloading of content, in accordance with embodiments of the present invention. The method 300 may include a step 310 of receiving, by one or more processors of a computer system, such as the receiving module 131 of the computer system 120, a request to download a plurality of images, such as the plurality of images 161, 162, 163, 164, 165, by a user, such as the user 114. The method 300 may include a step 320 of analyzing the gaze, such as the gaze 180, of the user relative to the intended location of at least one of the images. The method 300 may include a step 330 of determining, by the one or more processors of the computer system, such as the determining module 133 of the computer system 120, a first image, such as the image 161, that a user is interested in. The method may include a step 340 of enabling, upgrading, or prioritizing the first image download over the other images. The method 300 may include a step 350 of determining, by one or more processors of the computer system, such as the determining module 133 of the computer system 120, a second image, such as the image 162, that a user is not interested in. The method may include a step 360 of disabling, de-prioritizing, pausing, or reducing the second image download over the other images.

Figure 6:
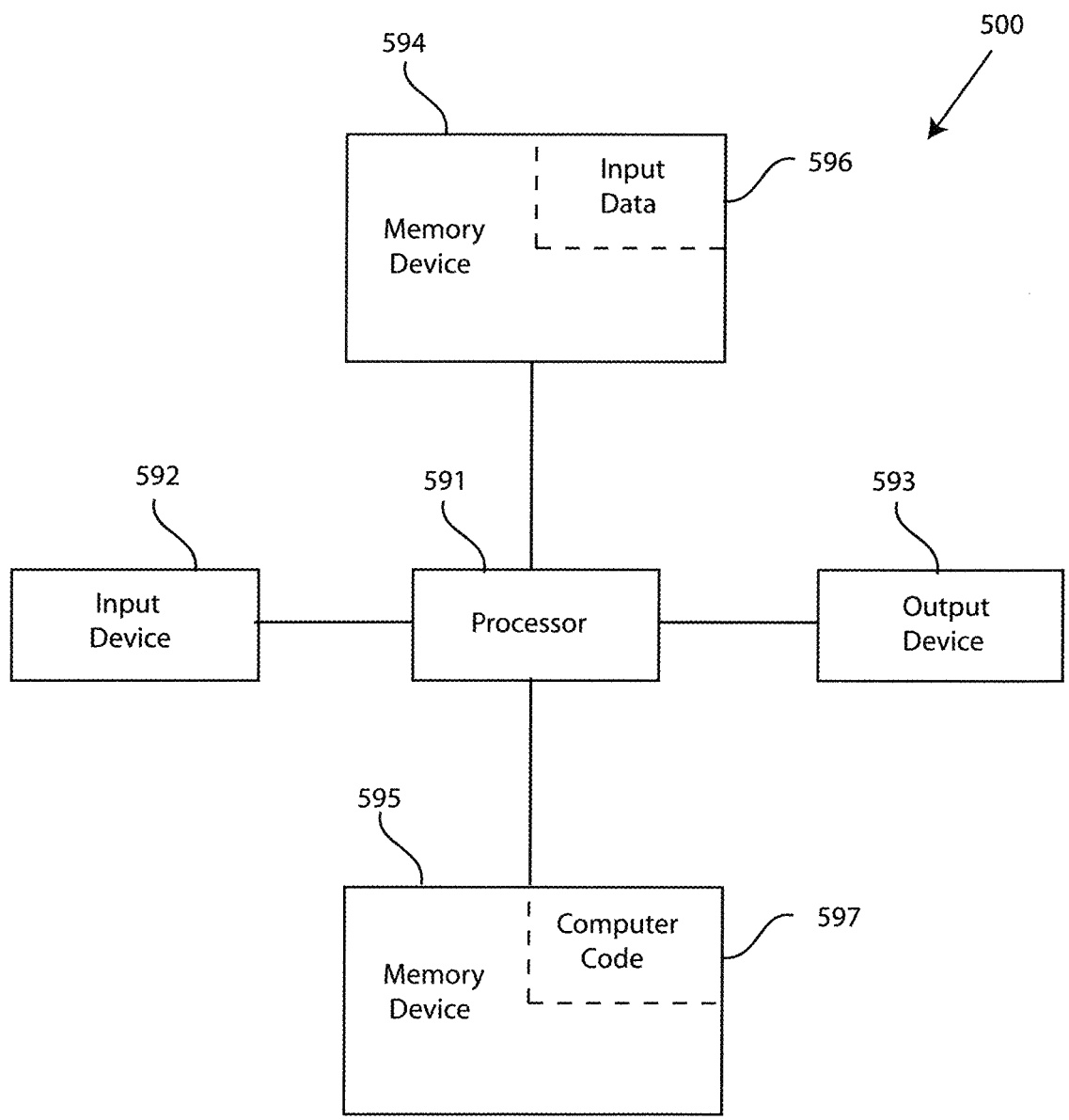
FIG. 6 depicts a block diagram of a computer system of the system for managing downloading of content of FIG. 1, capable of implementing methods for managing downloading of content of FIGS. 4-5, in accordance with embodiments of the present invention.

FIG. 6 illustrates a block diagram of a computer system that may representative of any computer or computer system within the system for managing downloading of content of FIGS. 1-3, capable of implementing methods for managing downloading of content of FIGS. 4-5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for managing downloading of content, in the manner prescribed by the embodiments of FIGS. 4-5 using the system for managing downloading of content of FIGS. 1-3, wherein the instructions of the computer code 597 may be executed by processor 591 via memory device 595. The computer code 597 may include software or program instructions that may implement one or more algorithms for implementing the methods for managing downloading of content, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computes usable storage medium (or said program storage device).

Memory devices 594, 595 include any known computer readable storage medium, including those described in detail below. In one embodiment, cache memory elements of memory devices 594, 595 may provide temporary storage of at least some program code computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system. 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive a CD-ROM drive which receives a CD-ROM disk). In other embodiments, the data storage unit may include a knowledge base or data repository 5 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for managing downloading of content. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for managing downloading of content Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for managing downloading of content. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for managing downloading of content.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are As Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
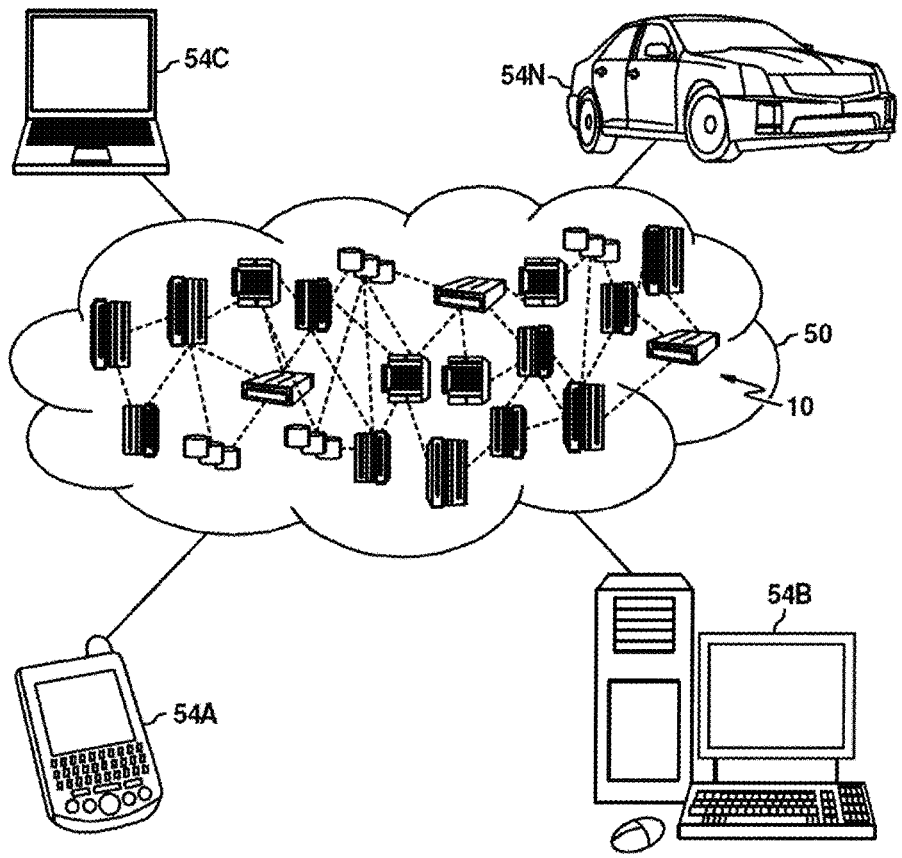
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
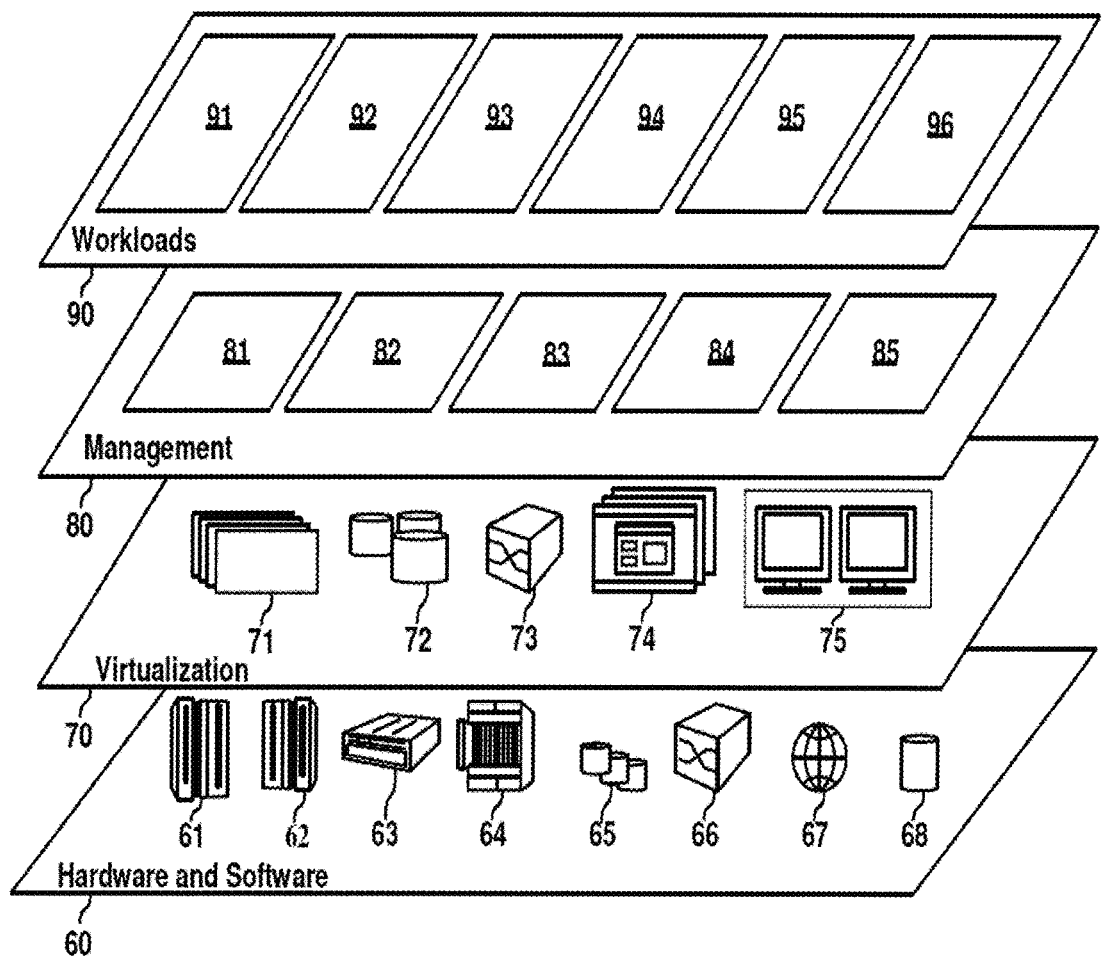
FIG. 8 depicts abstraction model layers, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to managing downloading of content 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing downloading of content, the method comprising:
   receiving, by one or more processors of a computer system, a request to download content by a user;
   determining, by the one or more processors of the computer system, a position of a given piece of the content being rendered on a display;
   receiving, by the one or more processors of the computer system, sensed information that captures a direction of a gaze of the user relative to the position of the given piece of content on the display;
   analyzing, by the one or more processors of the computer system, the sensed information received that captures the direction of the gaze of the user relative to the position of the given piece of the content on the display;
   determining, by the one or more processors of the computer system, an interest in the content based on the analyzing of the sensed information received; and
   adjusting, by the one or more processors of the computer system, a rate of download of the content by the user based on the determining.

2. The method of claim 1, wherein the content includes a plurality of images including a first image, and wherein the determining includes determining an interest in the first image based on the analyzing of the gaze of the user, the method further comprising:
   prioritizing, by the one or more processors of the computer system, the download of the first image above the other images of the plurality of images based on the determined interest in the first image.

3. The method of claim 1, wherein the content includes a first image, and wherein the determining includes determining an interest in the first image based on the analyzing of the gaze of the user, the method further comprising:
   pausing, by the one or more processors of the computer system, the download of the first image based on the determined interest in the first image.

4. The method of claim 1, wherein the content includes a plurality of images including a first image, and wherein the determining includes determining an interest in the first image based on the analyzing of the gaze of the user, the method further comprising:

deprioritizing, by the one or more processors of the computer system, the download of the first image below the other images of the plurality of images based on the determined interest in the first image.

5. The method of claim 1, wherein the content includes a plurality of images, the method further comprising:

determining, by the one or more processors of the computer system, a first of the plurality of images that the user is interested in based on the analyzing;

determining, by the one or more processors of the computer system, a second of the plurality of images that the user is not interested in based on the analyzing; and enabling, by the one or more processors of the computer system, the download of the first image; and pausing, by the one or more processors of the computer system, the download of the second image.

6. The method of claim 1, further comprising:

upgrading, by the one or more processors of the computer system, the rate of providing the content to the user based on the determined interest in the first image.

7. The method of claim 1, further comprising:

gradually rendering, by the one or more processors of the computer system, the content, wherein the analyzing occurs during the gradual rendering.

8. A computer system, comprising:

one or more processors;

one or more memory devices coupled to the one or more processors; and one or more computer readable storage devices coupled to the one or more processors, wherein the one or more storage devices contain program code executable by the one or more processors via the one or more memory devices to implement a method of managing downloading of content, the method comprising:

receiving, by the one or more processors of the computer system, a request to download content by a user;

determining, by the one or more processors of the computer system, a position of a given piece of the content being rendered on a display;

receiving, by the one or more processors of the computer system, sensed information that captures a direction of a gaze of the user relative to the position of the given piece of content on the display;

analyzing, by the one or more processors of the computer system, the sensed information received that captures the direction of the gaze of the user relative to the position of the particular given piece of the content on the display;

determining, by the one or more processors of the computer system, an interest in the content based on the analyzing of the sensed information, received; and adjusting, by the one or more processors of the computer system, a rate of download of the content by the user based on the determining.

9. The computer system of claim 8, wherein the content includes a plurality of images including a first image, and wherein the determining includes determining an interest in the first image based on the analyzing of the gaze of the user, the method further comprising:

prioritizing, by the one or more processors of the computer system, the download of the first image above the other images of the plurality of images based on the determined interest in the first image.

10. The computer system of claim 8, wherein the content includes a first image, and wherein the determining includes determining an interest in the first image based on the analyzing of the gaze of the user, the method further comprising:

pausing, by the one or more processors of the computer system, the download of the first image based on the determined interest in the first image.

11. The computer system of claim 8, wherein the content includes a plurality of images including a first image, and wherein the determining includes determining an interest in the first image based on the analyzing of the gaze of the user, the method further comprising:

deprioritizing, by the one or more processors of the computer system, the download of the first image below the other images of the plurality of images based on the determined interest in the first image.

12. The computer system of claim 8, wherein the content includes a plurality of images, the method further comprising:

determining, by the one or more processors of the computer system, a first of the plurality of images that the user is interested in based on the analyzing;

determining, by the one or more processors of the computer system, a second of the plurality of images that the user is not interested in based on the analyzing; and enabling, by the one or more processors of the computer system, the download of the first image; and pausing, by the one or more processors of the computer system, the download of the second image.

13. The computer system of claim 8, the method further comprising:

upgrading, by the one or more processors of the computer system, the rate of providing the content to the user based on the determined interest in the first image.

14. The computer system of claim 8, the method further comprising:

gradually rendering, by the one or more processors of the computer system, the content, wherein the analyzing occurs during the gradual rendering.

15. A computer program product, comprising a computer readable hardware storage device storing a computer readable program code, the computer readable program code comprising an algorithm that when executed by one or more processors of a computer system implements a method of managing downloading of content, the method comprising:

receiving, by the one or more processors of the computer system, a request to download content by a user;

determining, by the one or more processors of the computer system, a position of a given piece of the content being rendered on a display;

receiving, by the one or more processors of the computer system, sensed information that captures a direction of a gaze of the user relative to the position of the given piece of content on the display;

analyzing, by the one or more processors of the computer system, the sensed information received that captures the direction of the gaze of the user relative to the position of the given piece of the content on the display;

determining, by the one or more processors of the computer system, an interest in the content based on the analyzing of the sensed information received; and adjusting, by the one or more processors of the computer system, a rate of download of the content by the user based on the determining.

16. The computer system of claim 15, wherein the content includes a plurality of images including a first image, and wherein the determining includes determining an interest in the first image based on the analyzing of the gaze of the user, the method further comprising:

prioritizing, by the one or more processors of the computer system, the download of the first image above the other images of the plurality of images based on the determined interest in the first image.

17. The computer system of claim 15, wherein the content includes a first image, and wherein the determining includes determining an interest in the first image based on the analyzing of the gaze of the user, the method further comprising:

pausing, by the one or more processors of the computer system, the download of the first image based on the determined interest in the first image.

18. The computer system of claim 15, wherein the content includes a plurality of images including a first image, and wherein the determining includes determining an interest in the first image based on the analyzing of the gaze of the user, the method further comprising:

deprioritizing, by the one or more processors of the computer system, the download of the first image below the other images of the plurality of images based on the determined interest in the first image.

19. The computer system of claim 15, the method further comprising:

upgrading, by the one or more processors of the computer system, the rate of providing the content to the user based on the determined interest in the first image.

20. The computer system of claim 15, the method further comprising:

gradually rendering, by the one or more processors of the computer system, the content, wherein the analyzing occurs during the gradual rendering.

* * * * *